Feb. 22, 1966  W. REIST  3,236,162
DELIVERY APPARATUS FOR THE PRODUCTS OF A ROTARY PRESS
Filed Feb. 7, 1964
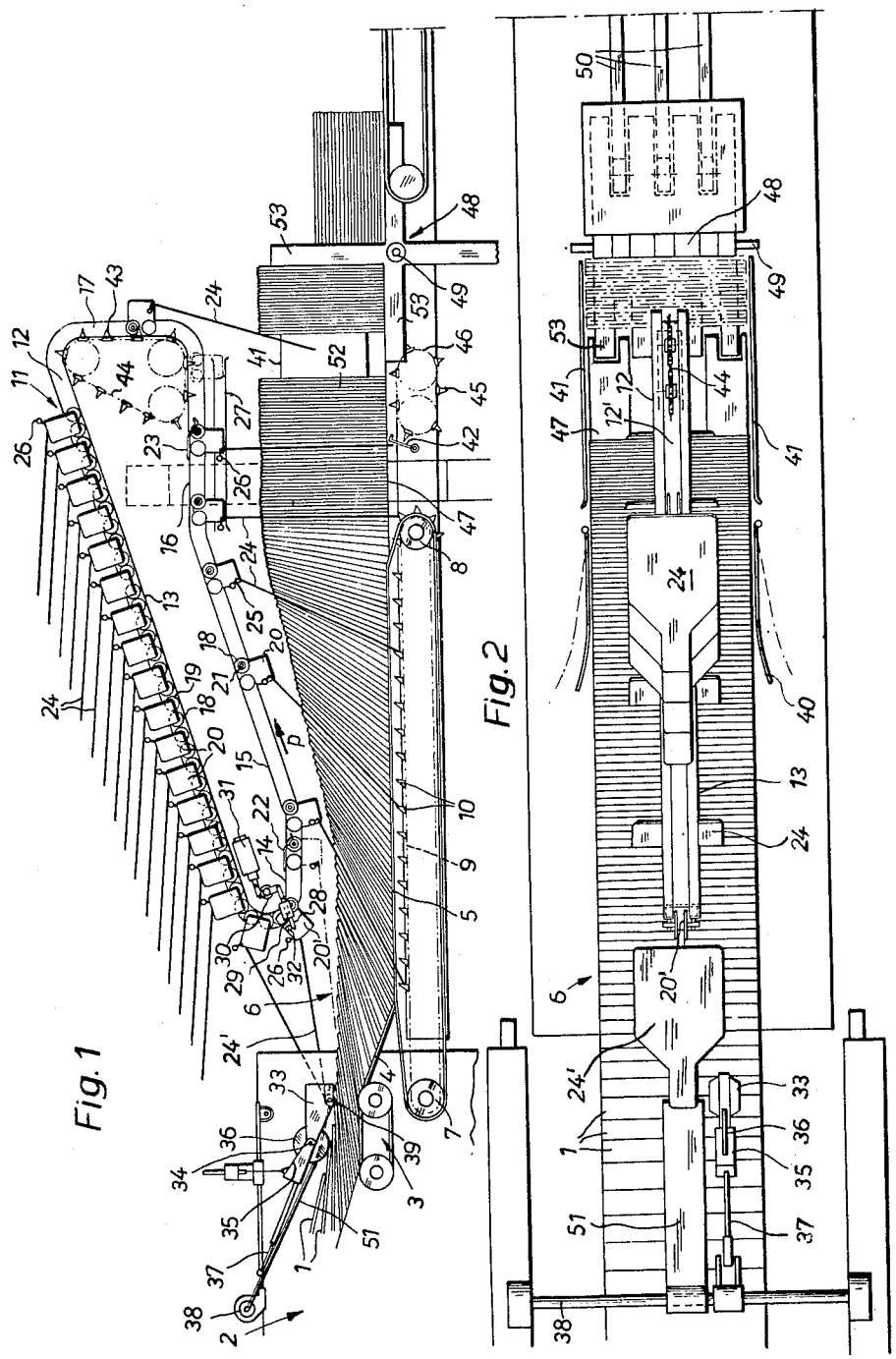

United States Patent Office 3,236,162
Patented Feb. 22, 1966

3,236,162
DELIVERY APPARATUS FOR THE PRODUCTS OF A ROTARY PRESS
Walter Reist, Hinwil, Zurich, Switzerland, assignor to Ferag, Fehr & Reist A.G., Zurich, Switzerland
Filed Feb. 7, 1964, Ser. No. 343,354
9 Claims. (Cl. 93—93)

The invention relates to a delivery apparatus for printed matter, such as newspapers or similar products, which are discharged in imbricated form, as for example from a rotary printing press.

It is a primary object of the invention to provide delivery apparatus for handling newspapers as they are successively discharged in imbricated form from a printing press, which apparatus counts the discharged newspapers and forms packages containing a predetermined number of newspapers.

The delivery apparatus according to the present invention comprises an endless travelling path composed of a plurality of differently directed sections, a plurality of carrier members independently movable along said travelling path, a plurality of separating arms each having one end pivotally connected to a carrier member, means for moving said carrier members along the travelling path, means for temporarily stopping the carrier members moving along said path and for releasing the stopped carrier members one by one, conveyor means for moving the imbricated succession of newspapers along certain of said travelling path sections following the point where the carrier members are stopped and released in timed succession, whereby the separating arm of the released carrier member engages the imbricated succession of newspapers and penetrates between two adjacent newspapers, so that packages containing a predetermined number of newspapers are formed between successive separating arms, and means for successively receiving and discharging the formed packages.

For the sake of convenience, the products which are handled by the delivery apparatus according to the invention are herein designated as "newspapers" although other products from a printing press could be handled, such as booklets or other printed matter having been folded by the press in order to have a certain thickness. The term "newspapers" is therefore intended to generally comprise any product of a printing press.

The invention will next be explained with reference to the accompanying drawings, in which FIG. 1 is a side view of delivery apparatus according to the invention, connected to a rotary printing press, and FIG. 2 is a plan view of the apparatus.

In the example illustrated, printed articles such as newspapers are delivered in imbricated arrangement from a rotary printing press 2 onto a short conveyor belt 3 and slide along a chute 4 onto two parallel spaced endless conveyor belts 5 (in the drawings only one conveyor belt is visible), forming a travelling path for the imbricated newspapers. An endless chain 9 passes over the guide rollers 7 and 8 of the belts 5 in the space between the two belts; this chain is provided with a plurality of driver claws 10, which point outwardly. The driver claws are uniformly spaced longitudinally of the chain 9. In the drawing not all the claws 10 are shown, for reasons of clarity, and the chain 9 is only diagrammatically represented. The upper side of the conveyor belts 5 on which the imbricated newspapers 6 are supported travels at a slightly higher level than the upper side of the chain 9, so that the driver claws 10 do not engage the lower edge of the imbricated newspapers.

An endless travelling path 11 is arranged above the path of the imbricated newspapers 6, the path 11 being formed by a rail 12, having a transverse section of C-shape. The open slot 12' of this rail faces outwardly as can be clearly seen from FIG. 2. In FIG. 1 the rail 12 is shown in section with a side wall of the rail broken away. The rail 12 is composed of an inclined section 13, a short horizontal section 14, an inclined section 15, a further horizontal section 16, and a vertical section 17. The sections 14, 15 and 16 from a portion of the travelling path 11, which extends along the travelling path of the imbricated newspapers 6.

A plurality of carriages 20 having wheel pairs 18 and 19 are arranged to travel along the rail 12, the carriages protruding out of the slot 12' of the rail. In the drawing, the rollers located in the section 14, 15 and 16 of the rail 12 are shown in section; each axle 21 of a pair of wheels 18 cooperates with a resilient abutment 22 secured to the horizontal rail section 14, and penetrating into the rail, and with a resilient abutment 23 secured to the horizontal railsection 16. It will be understood that an increased force is required in order to make the carriage pass these resilient abutments 22 or 23 in the direction of the arrow P. The purpose of this arrangement will be described in detail later.

The carriages 20 are provided each with a space-shaped separating arm 24 (see also FIG. 2) which is hingedly connected with one of its ends on the carriage at 25 in the plane of the path 11. Swinging of the separating arms 24 in counter clockwise direction is limited by an abutment, not shown, the abutting position being indicated for the arms 24 of the carriages located on the downwardly inclined section 13 of the rail 12. Movement of the separating arms 24 in clockwise direction is not limited. Each separating arm 24 is provided with guide member 26 which, when the carriages travel along the horizontal rail section 16, engages into a guide-rail 27, and thus prevents any movement of the respective separating arm. The guide rail 27 extends over the length of the horizontal rail section 16, and when the separating arm 24 leaves the guide rail 27, it is free to move again. The arrangement and operation of the guide rail 27 in relation to the commencement of the locking of the separating arms, will be explained later in detail.

A bolt 28 is arranged in the vicinity of the connection of the inclined rail section 13 with the horizontal rail section 14. This bolt is slidable in a guide 29, and can be moved by means of an electromagnet 31, and an intermediate lever 30. The bolt 29 is adapted to project into the travelling path of the carriages and to coact with a stop 32 of the carriages. In FIG. 1 only the stop 32 of that particular carriage which just has been stopped by the bolt 28 is shown. This particular carriage is designated by 20' and when it is stopped by the bolt, it supports and blocks all other carriages 20 located on the inclined rail section 13. The end of the separating arm 24' of the carriage 20' abuts against the end portion of a flat supporting blade 51 which is hinged at its other end to shaft 38, while its front end is supported by the imbricated newspapers. A bracket 33 is hingedly connected to a pin 34 laterally of the blade 51 and is also supported on the imbricated arrangement of newspapers 6. The pin 34 extends between the two arms of a fork 35 and carries a wheel 36 which rolls on the top of the imbricated newspapers. The fork 35 is hingedly connected to the shaft 38 through the intermediary of a connecting rod 37.

The bracket 33 carries a microswitch, not shown having an actuating member 39 which protrudes into the path of movement of the newspapers 1 discharged from the printing press. When the imbricated formation of newspapers 6 advances along with the conveyor belts 5, the upper edge of each newspaper causes the member 39 to slightly move upwards and to fall down again as soon as the edge has passed. Thus, during the advancing movement of the newspapers, the switch actuating member 39 continuously oscillates up and down and at each oscillation the actuated microswitch imparts an impulse to an electronic counting device, not shown, which counts the impulses and thus the number of newspapers passing underneath the micro-switch.

The electric counting device can be so adjusted that after a selected number of newspapers have passed the switch actuating member 39, the bolt 28 is withdrawn for a moment by the electromagnet to release one carriage 20 and to block the next following carriage.

The operation of the distributing apparatus will now be described.

The carriage 20 which is released by the short withdrawal of the bolt 28 is accelerated owing to its own weight and the weight of all those carriages which are located above the carriage 20' on the inclined section 13 of the rail 11, these last mentioned carriages being blocked again by the quick returning bolt 28. The released carriage 20' travels along the horizontal rail section 14 and the free end of the separating arm 24 of this carriage is pulled off the bracket 33 falling onto the imbricated newspapers. These newspapers are constantly moving towards the right in the drawings and take the carriage along until the carriage arrives at the yielding abutment 22. The carriages and the arm 24 are shown in dash and dot lines in this position. When the carriage stops and the imbricated newspapers move along, the free end of the separating arm 24 which rests thereon, begins to rotate and starts to penetrate more and more deeply between two successive newspapers. The arm moving with the newspapers continues to undergo angular rotation about its hinge and the free end of the arm soon penetrates entirely through the file of newspapers and projects from the bottom side thereof, where it is then gripped by one of the driver claws 10 of the chain 9.

Owing to the force transmitted by the moving claw 10 on the arm 24 and on the carriage 20', this latter carriage passes the abutment 22 and the chain 9 drives it upwards along the inclined rail section 15 in the direction of the arrow P. As can be seen from FIG. 1 the separating arm 24 gradually approaches a vertical portion and arrives in this position just when the carriage arrives at the upper end of the rail section 15 and moves onto the horizontal rail section 16. It will be understood from the preceeding description and the drawings, that the separating arms 24 of the carriages which are released at timed intervals according to the adjustment of the microswitch, arrange the imbricated newspapers into piles or packages and since the arms 24 gradually assume a vertical position the piles gradually are placed upright with the newspaper standing on their edges. This turning movement of a pile is facilitated, by guideplates 40 (FIG. 2) which abut against the sides of the newspapers and also bring the newspapers in lateral alignment, preferably by being subjected to a vibratory oscillating motion as indicated in FIG. 2 by dash and dot lines. Following the movable guide plates 40, rigid guide plates 41 are provided on both sides of the piles of newspapers, which laterally support the pile. The arrangement may be such that the newspapers are slightly curved in horizontal direction so that they become stiffer and the pile will be easier to support.

When the carriage 20 reaches the beginning of the horizontal rail section 16, then the respective separating arm 24 is already in a vertical position and is locked in this position by its guide arm 26 cooperating with the rail 27, during the continued movement of the carriage along the horizontal rail section 16. The movement of the carriage along the horizontal section 16, is effected by the continued movement of the imbricated newspapers formation in the rear of the vertical piles, because the separating arms 24, at the end of the inclined section 15, are released from engagement by the claws 10 of the chain 9.

The chain however is still indirectly responsible for the movement of the carriage along the horizontal rail section 16 through intermediary of the newspaper pile immediately following behind the first vertical separating arm, which pile is pushed forwards by the separating arm of that carriage which is still on the inclined rail section 15. The carriage on the horizontal section 16 is rolled along this section until it is stopped by the spring stop 23. A further resilient stop 42 engages the free end of the respective separating arm 24. The pile of newspapers immediately following the locked arm 24 thus is compressed together. After overcoming the resistance of the flexible stops 23 and 42, the pile of newspapers is pushed further along by the separating arm 24 located at the front of the pile, while an endless conveyor chain 44 provided with grippers 43 engages with the carriage and a second conveyor chain 46, likewise provided with grippers 45 engages with the free end of the separating arm. The travelling speed of both chains 44 and 45 is slightly greater than the speed of the imbricated newspapers, so that the separating arm which is engaged by these conveyor chains, either directly or by the intermediary of the carriage, is separated from the pile of newspapers situated on the back of the arm and pushes forward the pile of newspapers 52 situated in front of it. The two piles of newspapers cannot collapse because they are held and supported laterally by the guide plates 41.

A newpaper delivery cross 48 having four series of arms 53 is rotatable on an axis 49 and is adapted to turn stepwise through 90°, so that one of the series of arms 53 always forms an extension of a platform 47 on which the newspapers slide when they leave the conveyor belts 5. The opposite horizontal series of arms of the cross 48 penetrate between conveyor belts 50, which receive a pile of newspapers resting on this arm as will be described later to convey the pile of newspapers further.

The cross 48 is arranged so that when a carriage 20 arrives at the end of the horizontal rail section 16 and its separating arm 24 is released from the guide rail 27, the conveyed pile of newspapers is pushed against the vertical series of arms of the cross 48. The carriage is then engaged by the grippers 43 of the endless chain 44 and travels upwards on the vertical rail section 17, while the cross turns through 90° as soon as the separating arm 24 of the raised carriage has moved out of the path of the arms 53. The pile of newspapers moving with the cross is thus deposited on the conveyor belts 50 and transported further for example to a packing station. The carriage which has been raised is released by the conveyor chain 44 at the beginning of the downward sloping section 13 of the rail 12 and then slides down by gravity until it meets the series of carriages which are supported by the bolt 28.

As previously mentioned, the bolt 28 is successively retracted for short moments by the action of electric impulses energizing the electromagnet 31, which impulses are generated by the mentioned microswitch actuated by the member 39 and fed to the counting device. This device can be adjusted so that after a predetermined number of impulses, the electromagnet 31 is energized and the bolt retracted, so that the carriage 20' is released when a predetermined number of impulses have been transmitted to the counting device. Accordingly, the number of newspapers transported is counted on the one hand, and on the other hand, packages of newspapers having a predetermined number of newspapers are formed by the periodic release of a carriage 20. The number of newspapers in a package can be predetermined by a corresponding adjustment of the counting device; it is also possible to control the counter by a programming device, whereby packages having a variable number of newspapers could be formed. It will be possible, for example, to control the emission of impulses of the counting device coupled to the electromagnet 31 by means of punched cards.

The described delivery apparatus, instead of being directly connected to the delivery end of a rotary press as shown, could be connected thereto by the intermediary of a conveyor device.

I claim:
1. Delivery apparatus for products discharged from a rotary press in imbricated form the apparatus comprising means defining an endless travelling path including a plurality of straight sections inclinedly coupled to one another, a plurality of carrier members each including means movably supported in said sections to enable each carrier member to be independently movable along said travelling path, a plurality of separating arms each having one end pivotally connected to a respective carrier member, means for moving said carrier members along the travelling path, means for temporarily stopping a group of the carrier members from moving along said path and for releasing in time-wise succession stopped carrier members one by one for subsequent movement, conveyor means for moving the imbricated succession of products along certain of said traveling path sections following the point where the carrier members are stopped and released in succession to cause the separating arm of the released carrier member to engage between the imbricated succession of products and gradually penetrate between two adjacent products as the latter are advanced so that packages containing a predetermined number of products are formed between the separating arms of successive carrier members, and means for successively receiving and discharging the thus formed packages.

2. Delivery apparatus according to claim 1, in which the section of said travelling path ahead of said stopping and releasing means is downwardly inclined, the carrier members on said section being supported by the stopping means.

3. Delivery apparatus according to claim 2, comprising a supporting bracket adjacent said conveyor means, the separating arm of the stopped carrier member abutting against said stopping means being supported by said bracket and directed towards the imbricated succession of products, said separating arm being pulled off the bracket and its free end falling upon the imbricated products when the carrier member is released and moves along the travelling path.

4. Delivery apparatus according to claim 3, in which the travelling path section, following the stopping and releasing means comprises a resiliently yielding abutment for temporarily stopping the carrier member which has been released and is moving along the travelling path, while the imbricated succession of products continues its movement and acts against the separating arm of the stopped carrier member, whereby the free end of the separating arm resting on the succession of products penetrates between two adjacent products until it projects from the opposite side of the succession of products, an endless conveyor chain provided with gripper members extending parallel with said conveyor means for the imbricated succession of products, said gripper members being adapted to engage the projecting end of the separating arms and to move the corresponding carrier members along a portion of said travelling path.

5. Delivery apparatus according to claim 4, in which said portion of the travelling path along which the carrier members are moved by said conveyor chain is diverging with respect to the conveyor path of the products, so that said separating arm resting on the succession of products and penetrating between two adjacent products first is inclined with respect to the conveying path of the products and gradually is turned into vertical position and is locked in this position when reaching the end of the diverging portion of the travelling path and during movement along a following portion of the travelling path.

6. Delivery apparatus according to claim 5, in which further resiliently yielding abutment is provided on said portion of the travelling path for the carrier members following said diverging portion, the latter said abutment temporarily stopping a carrier member having a locked separating arm, so that the products moved by the separating arms of the carrier members on said diverging portion of the travelling path urge and compact a package of upright disposed products against the locked separating arm, lateral guides for the products being provided along the portion of the conveyor path of the products in the region thereof where the separating arms are locked in vertical position.

7. Delivery apparatus according to claim 6, comprising conveyor means for the separating arms and their carrier members following said latter resiliently yielding abutment, said conveyor means being arranged to move a carrier member and its separating arm passing said latter abutment with an increased speed relative to the speed of the imbricated formation of products before said latter abutment, so that a compacted packaged of products situated in front of the separating arm having passed said latter abutment is separated from the succession of products at the rear thereof and fed to a package discharging device, while said carrier member and its separating arm are transported by said increased speed conveyor means to the beginning of said downwardly inclined section of the travelling path for the carrier members.

8. Delivery apparatus according to claim 1, in which said means for temporarily stopping the carrier members comprises a bolt supporting the carrier members, an electromagnet, said bolt being retractable from the path of movement of the carrier members against spring action by means of said electromagnet, the impulses for energizing the electromagnet being emitted by a counter of the delivered products upon a predetermined number of products having been counted.

9. Delivery apparatus according to claim 8 in which the value of the numbers determinative for the emission of a magnet energizing impulse are stored in a programming device.

References Cited by the Examiner

UNITED STATES PATENTS

| | | | |
|---|---|---|---|
| 964,166 | 7/1910 | Klinck | 198—35 X |
| 2,677,317 | 5/1954 | Vogt | 93—93 X |

FOREIGN PATENTS 1,276,252  10/1961  France.

M. HENSON WOOD, JR., *Primary Examiner.*

ROBERT B. REEVES, *Examiner.*